Figure 1:
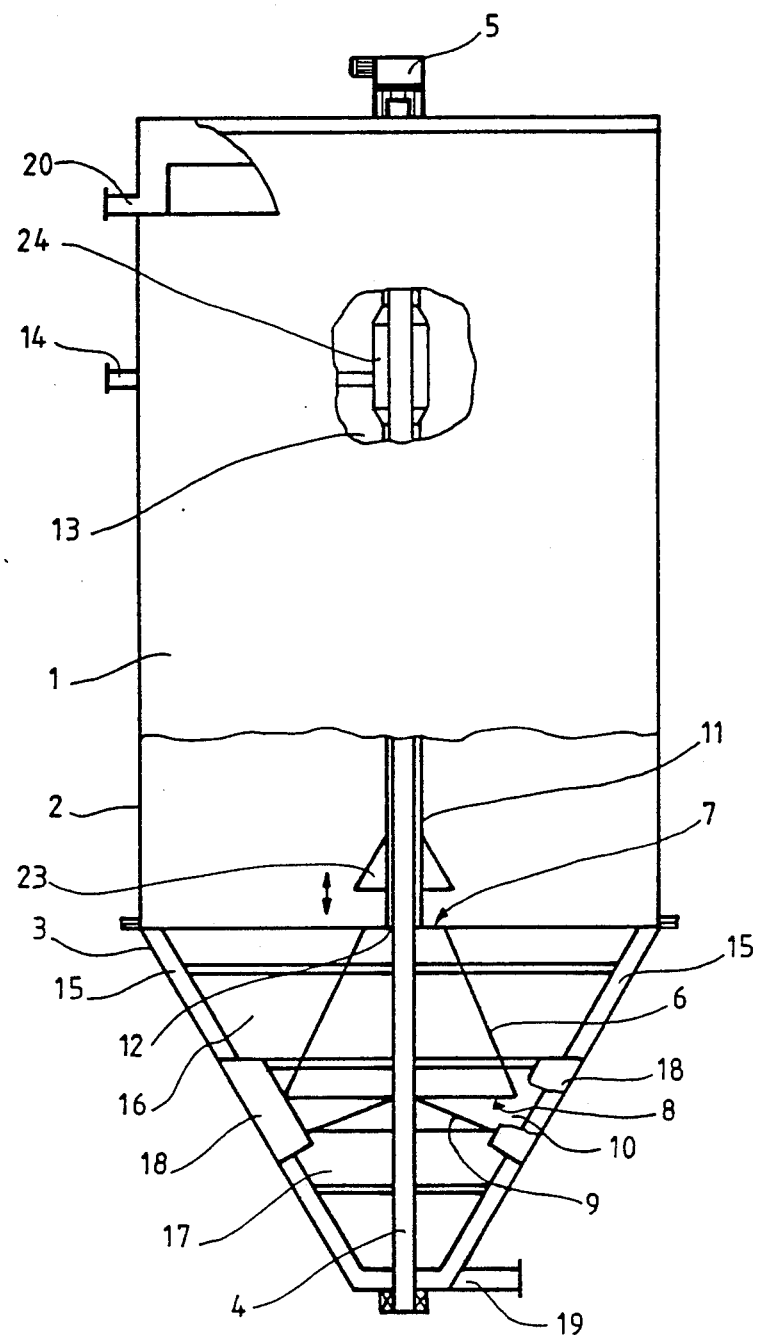

United States Patent [19]
Titoff

[11] Patent Number: 4,871,459
[45] Date of Patent: Oct. 3, 1989

[54] FILTER BED CLARIFIER

[75] Inventor: Juha S. Titoff, Kerimäki, Finland

[73] Assignee: A. Ahlstrom Corporation, Noormarkku, Finland

[21] Appl. No.: 241,452

[22] Filed: Sep. 8, 1988

[30] Foreign Application Priority Data

Sep. 14, 1987 [FI] Finland .................................. 873971

[51] Int. Cl.⁴ ............................................. B01D 21/06
[52] U.S. Cl. ..................................... 210/519; 210/521; 210/528; 210/534; 210/207
[58] Field of Search ............... 210/205, 207, 268, 285, 210/383, 519, 521, 528, 534, 715, 786

[56] References Cited

U.S. PATENT DOCUMENTS

| | | | |
|---|---|---|---|
| 196,259 | 10/1877 | Solvay | 210/528 |
| 400,807 | 4/1889 | Toepfer | 210/534 |
| 958,832 | 5/1910 | Russell | 210/519 |
| 1,526,197 | 2/1925 | Ahlquist | 210/521 |
| 1,943,330 | 1/1934 | Mitchell | 210/268 |
| 2,230,386 | 2/1941 | Pecker | 210/521 |
| 2,793,186 | 5/1957 | Dunell et al. | 210/521 |
| 3,250,394 | 5/1966 | Clark | 210/519 |
| 4,197,201 | 4/1980 | Hjelmner et al. | 210/268 |

FOREIGN PATENT DOCUMENTS 255094 9/1962 Australia .

Primary Examiner—Peter Hruskoci
Assistant Examiner—Christopher Upton
Attorney, Agent, or Firm—Nixon & Vanderhye

[57] ABSTRACT

A filter bed clarifier comprising a tank (1), which consists of an upper, cylindrical part (2) and a lower, tapered part (3) and which is provided with a centrally disposed feed pipe (11) for the liquid to be clarified. The feed pipe has an outlet leading into the tank at the top opening (7) of the circulating/mixing cone (6) disposed in the lower, tapered part of the tank. The top opening is larger than the outlet opening (12) of the feed pipe so that the sludge being discharged from the feed pipe draws sediment flocs from the lower part of the bed, thus causing internal circulation of the sediment. The apparatus is especially suitable for clarifying green liquor.

14 Claims, 2 Drawing Sheets

FILTER BED CLARIFIER

The present invention relates to a filter bed clarifier comprising a tank which consists of an upper, cylindrical part and a lower, tapered part and which is provided with a centrally disposed feed pipe for the sludge to be clarified.

The apparatus according to the invention is suitable for separating various liquids and solids from each other and has been especially developed for separating green liquor sediment from green liquor. Green liquor is a sludge containing $Na_2CO_3$ and $Na_2S$, which is produced when the melt issuing from the soda recovery boiler is dissolved in water in the chemical recovery process in stock preparation. Purity of green liquor is very important in pulp mills. Higher purity provides cost savings because of a smaller size of equipment required, reduced need for lime change, less chemical losses as well as improved filtering characteristics of lime sludge.

Clarifiers with a filter bed have long been used in water treatment plants. Their advantages over clarifiers operating on a settling principle are, for example, a smaller size of equipment required and a higher degree of separation.

The clarifier according to the invention is based on the concept of a hydraulically fluidized filter bed, the operating principle of which is disclosed, for example, in the following article: Tesarik, J., Flow in sludge-blanket clarifiers. Journal of the Sanitary Engineering Division, Proceedings of the American Society of Civil Engineers, Vol. 93, No. SA6, December 1967, pp. 105–120. The sludge to be introduced into the filter bed clarifier is flocculated by means of a polymer. The filter bed binds the flocculated solids that are present in the upwardly-flowing sludge. The liquid released from the solids, i.e. the clarified liquid, is removed from the liquid layer formed on the upper surface of the filter bed.

FIG. 5 of the aforesaid article shows a filter bed clarifier comprising a tank which consists of an upper, cylindrical part and a lower, tapered part and which is provided with a centrally disposed and downwardly extending feed pipe. The lower edge of the feed cone together with the bottom of the tank form an annular discharge opening, which distributes the sludge to be fed evenly over the filtering bed. Thickened sludge is removed from the upper surface of the the bed through overflow openings disposed on the periphery of the tank. Clarifiers with hydraulically fluidized filter beds have also been disclosed in, for example, GB patent specifications 1437140 and 1445485.

The object of the invention is to provide an apparatus improved in comparison with the one disclosed in said article and with other known clarifiers utilizing a hydraulically fluidized filter bed. To achieve this object, the feed pipe of the clarifier according to the invention has an outlet leading to the top opening of the circulating/mixing cone (truncated conical baffle member) disposed in the tapered part of the tank, said top opening of the cone being larger than the outlet opening of said feed pipe.

When being discharged from the feed pipe to the circulating/ mixing cone, the sludge jet draws sediment flocs from the fluidized sediment bed above and carries them further through the top opening of the cone into the cone, where the sediment flocs are mixed with the feed jet. Because of the thus created internal circulation of the sediment, the densities of the infeed and the sediment bed become balanced and the consumption of polymer is cut down. A special circulation pump for sediment becomes unnecessary, whereby disintegration of sediment flocs in the pump is avoided.

Figure 2:
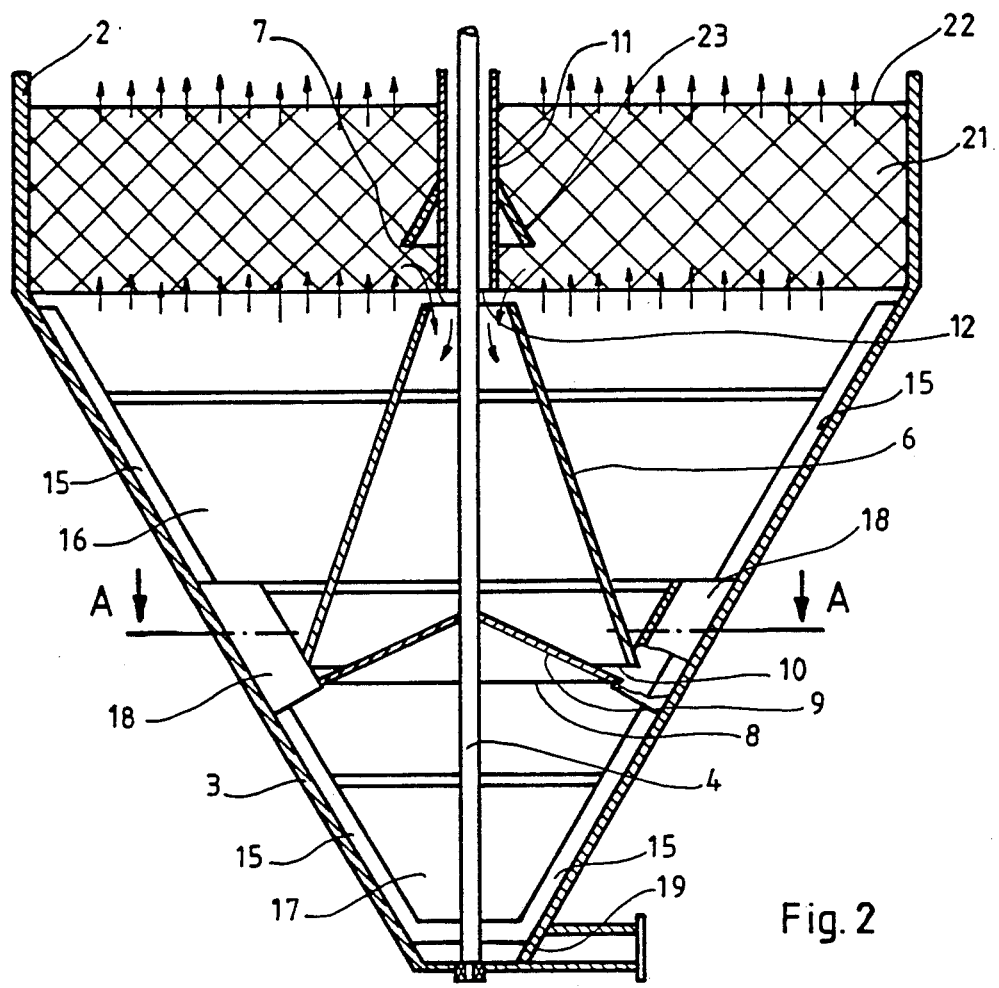
Figure 3:
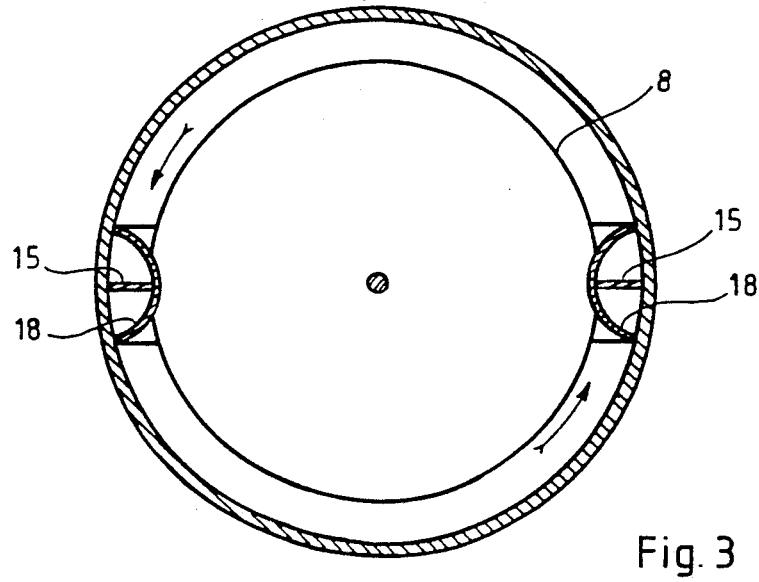

The invention is described more in detail below, by way of example, with reference to the accompanying drawings, in which FIG. 1 is an elevation, partially sectionalised, of an apparatus according to the invention, FIG. 2 is an enlarged sectional detail of the lower part of the apparatus of FIG. 1, and FIG. 3 is a sectional view taken along line A—A of FIG. 2.

The apparatus illustrated in the drawings comprises a tank 1, which has an upper, cylindrical part 2 and a lower, tapered part 3. A coaxial shaft 4, rotatable by a motor 5 disposed on top of the tank, extends through the tank. Attached to the shaft is a truncated circulating/mixing cone 6 in the form of an inverted, funnel-like baffle, which is so disposed in the lower, tapered part of the tank that its top opening 7 faces upwardly and its lower edge 8 is spaced at a small distance from the inner surface of the tapered part of the tank. The shaft 4 is also connected with a guide cone 9 disposed below the circulating/mixing cone 6. These cones 6, 9 form an annular opening 10 therebetween. Disposed around the shaft 4 is a pipe 11 having an outlet opening 12 at its lower end disposed in the region of the larger top opening 7 of the circulating/mixing cone. The upper end 13 of the pipe 11 is connected to an inlet pipe 14 for inlet of the sludge which is to be clarified. Also connected to the shaft 4 is scraper means 15 comprising flat rods that wipe the inner surface of the lower part when the shaft 4 rotates. At the edges of the cones 6 and 9 near the scrapers, there are sediment discharge duct members or pits 18, which interrupt the opening 10 and form channels by means of which the tank spaces 16 and 17 above and below the opening are connected to each other. The lower end of the tapered part of the tank is provided with an opening 19 for discharging the sediment. The upper end of the cylindrical part of the tank is provided with a discharge opening 20 for the clarified liquid. Above the top opening 7 of the circulating/mixing cone 6 is disposed a cone 23, which is movable upwardly and downwardly along the surface of the feed pipe 11, thereby opening or closing the top opening 7 of the circulating/mixing cone 6. Movements and adjustment of the cone 23 are effected by a hoisting-/adjusting element 24 disposed in an upper region of the tank 1.

Internal circulation of the sediment is adjustable or controllable by means of the cone 23, and after a standstill of the clarifier, when a sediment bed 21 has settled in the space 16 of the cone 3, the top opening of the circulating/mixing cone 6 can be so closed that the feed flow through the outlet opening 12 of the feed pipe 11 is caused to be discharged through the annular opening 10 and further below the sediment bed 21 settled in the space 16 of the cone 3.

The apparatus functions as follows. The sludge to be clarified, such as green liquor, with added polymer which contributes to flocculation, is fed through the inlet pipe 14 to the feed pipe 11, wherefrom it is discharged through the outlet opening 12 in the form of a jet into the circulating/mixing cone 6. Therefrom the sludge, evenly distributed, flows upwards through the annular opening 10 between said circulating/mixing cone 6 and the guide cone 9 to the enlarging annular space 16. Part of the sludge forms the fluidizing filtering sediment bed 21, mainly in the cylindrical part of the tank, and another part flows downwardly as will be described more in detail the following.

When being discharged from the outlet opening 12 of the feed pipe, the sludge jet draws with it sediment flocs from the fluidized sediment bed 21 above and carries them into the circulating/mixing cone, where they become mixed with the feed jet. After being discharged from the circulating/mixing cone, the light flocs are raised by the flow to the sediment bed. Heavy and large flocs flow to the sediment concentration part 17 disposed below the annular opening 10, wherefrom the sediment, either continually or intermittently, is discharged through the discharge opening 19.

In the space 16 which enlarges considerably (about 60°) upwards, a downward flow (a so-called back eddy) is formed in the vicinity of the walls and flocs tend to settle on the walls. The rotating scraper 16 as well as the rotating movement of the cone 6 maintain the areas near the walls in a fluidized state.

Those sediment flocs which have become too big and too dense for the velocity of the upwardly flowing sludge to fluidize them, flow down along the conical wall of the tank and are further guided by the scrapers to the sediment discharge pit 18, wherefrom they flow, protected from the flow issuing from the annular opening 10, further to the sediment concentration chamber 17. The rotation of the sediment discharge pit secures even discharge of the sediment from below the bed. In the concentration part, the rotary movement of the scraper 15 maintains the sediment to be discharged uniform in quality and suitable for discharging. After flowing through the filter bed 21, the liquid separated from the solids is removed from the liquid layer formed on top the upper surface 22 of the bed through the discharge opening 20.

The invention is not limited to the embodiment described above, but several variations thereof are possible within the inventive scope defined in the accompanying claims.

We claim:

1. A filter bed clarifier for separating solids and a liquid forming a sludge one from the other, comprising:
   a tank having an outer wall including an upper, generally cylindrical part and a lower, generally tapered part, said lower tapered part narrowing in a downward direction;
   a centrally disposed feed pipe in said tank for feeding the sludge into said tank and having an outlet means, said feed pipe being spaced from said tank wall to define a region in said tank for forming a filter bed;
   a truncated conical member disposed in said lower tapered part of said tank and having a top inlet opening and a lower edge, said lower edge being larger in diameter than said inlet opening;
   said feed pipe outlet means being disposed at an elevation in said tank generally corresponding to or higher than the elevation of said inlet opening to feed sludge into said inlet opening of said conical member and to aspirate material from said filter bed through said inlet opening for mixing and circulating the material of the filter bed and the sludge from said feed pipe outlet means one with the other;
   said top inlet opening being larger in diameter than the diameter of said feed pipe; and
   the lower edge of said conical member and said lower tapered part defining an annular opening therebetween for flowing at least part of the mixture upwardly into the filter bed.

2. Apparatus according to claim 1 including at least one sediment discharge duct adjacent said annular opening and which interrupts said opening and provides communication between the tank spaces above and below said annular opening.

3. Apparatus according to claim 2 including at least one scraper disposed within the sediment discharge duct and extending above and below said duct for scraping solids from the wall of said tank above the duct for flow through the duct into the tapered part of said tank.

4. Apparatus according to claim 3 wherein said duct and said scraper are mounted for movement along the surface of said tapered part, and means for jointly rotating said duct and said scraper.

5. Apparatus according to claim 2 wherein said feed pipe outlet means and said inlet opening are located in said tank at generally the same elevation as the transition between said upper cylindrical part and said lowered tapered part, at least one scraper above said annular opening and movable along the wall of said tank for directing solids along said wall into said duct, and a second scraper below said annular opening and movable along the wall of said tank.

6. Apparatus according to claim 5 wherein said first and second scrapers and said discharge duct are located in said tapered part of said below the transition between said upper cylindrical part and said lower tapered part.

7. Apparatus according to claim 1 including at least one scraper above said annular opening and movable along the surface of said lower, tapered part of the tank.

8. Apparatus according to claim 1 including at least one scraper disposed below said annular opening and movable along the surface of said lower, tapered part of the tank.

9. Apparatus according to claim 1 including means for rotating said conical member.

10. Apparatus according to claim 1 including a scraper mounted for movement along the surface of said tapered part, and means for jointly rotating said conical member and said scraper.

11. Apparatus according to claim 1 including a sediment discharge opening at the lower end of said tapered part of said tank.

12. Apparatus according to claim 1 including a discharge opening for the clarified liquid at the upper end of said cylindrical part.

13. Apparatus according to claim 1 including a conically-shaped element disposed above said top inlet opening of said conical member and movable vertically relative to said feed pipe, and means for vertically moving said conical element in relation to said top inlet opening for adjusting the feed therethrough.

14. Apparatus according to claim 1 wherein said feed pipe outlet means and said inlet opening are located in said tank at generally the same elevation as the transition between said upper cylindrical part and said lower tapered part.

* * * * *